(12) United States Patent
Stewart et al.

(10) Patent No.: US 7,271,960 B2
(45) Date of Patent: Sep. 18, 2007

(54) UNIVERSAL VEHICLE HEAD UP DISPLAY (HUD) DEVICE AND METHOD FOR USING THE SAME

(76) Inventors: Robert J. Stewart, 55 Sassafras Trail, Savannah, GA (US) 31404; Michael R. Smith, 1317 Ridgewood Dr., Starkville, MS (US) 39759; Steven A. Stringfellow, 3245 Wains Way, Oakland Township, MI (US) 48363

( * ) Notice: Subject to any disclaimer, the term of this patent is extended or adjusted under 35 U.S.C. 154(b) by 0 days.

(21) Appl. No.: 11/187,833

(22) Filed: Jul. 25, 2005

(65) Prior Publication Data

US 2007/0019297 A1  Jan. 25, 2007

(51) Int. Cl.
G02B 27/14 (2006.01)
G09G 5/00 (2006.01)

(52) U.S. Cl. ............................ 359/630; 359/634; 345/7

(58) Field of Classification Search ........ 359/630–634; 345/7–9; 353/13; 349/11
See application file for complete search history.

(56) References Cited

U.S. PATENT DOCUMENTS

| | | |
|---|---|---|
| 3,503,146 A | 3/1970 | Woplin |
| 3,945,716 A | 3/1976 | Kinder |
| 4,188,090 A | 2/1980 | Ellis |
| 4,725,125 A | 2/1988 | Ellis et al. |
| 4,775,218 A | 10/1988 | Wood et al. |
| 4,937,665 A | 6/1990 | Schiffman |
| 4,962,998 A | 10/1990 | Iino |
| 5,381,267 A | 1/1995 | Woody |
| 5,517,337 A | 5/1996 | Dupin et al. |
| 5,684,496 A | 11/1997 | Parus |
| 5,841,408 A | 11/1998 | Rickard |
| 5,867,287 A | 2/1999 | Williams et al. |
| 6,072,444 A | 6/2000 | Burns |
| 6,078,428 A | 6/2000 | Rambert et al. |
| 6,301,053 B1 | 10/2001 | Cheesman |
| 6,343,863 B1 | 2/2002 | Wood |
| 6,445,506 B1 | 9/2002 | Eccles |
| 2002/0089469 A1 | 7/2002 | Cone et al. |
| 2005/0248852 A1* | 11/2005 | Yamasaki ............. 359/630 |
| 2006/0119539 A1* | 6/2006 | Kato et al. ............. 345/8 |
| 2006/0146518 A1* | 7/2006 | Dubin et al. ........... 362/106 |

FOREIGN PATENT DOCUMENTS

WO   WO98/20380   *   5/1998

* cited by examiner

*Primary Examiner*—Alicia M Harrington
(74) *Attorney, Agent, or Firm*—Reed Smith LLP; Stanley P. Fisher, Esq.; Juan Carlos A. Marquez, Esq.

(57) ABSTRACT

The invention generally relates to an integrated head up displaying (HUD) device including a housing that houses an active-matrix image projecting system and its accompanying electronics, and an optical combiner (for providing a see-through image thereon) connected to the housing via a retractable arm attached at one end to the main body and holds the HUD optical panel at its other end. In particular, the telescopically retractable arm allows the assembly to extend or retract for a desirable combiner height. Further, the LED backlighting array is placed within a reflective light chamber which is lined with a safe, light-weight, low cost, specular, reflective sheet for high reflectivity. The non-conductive, reflective sheet also covers the LED printed circuit board.

18 Claims, 10 Drawing Sheets

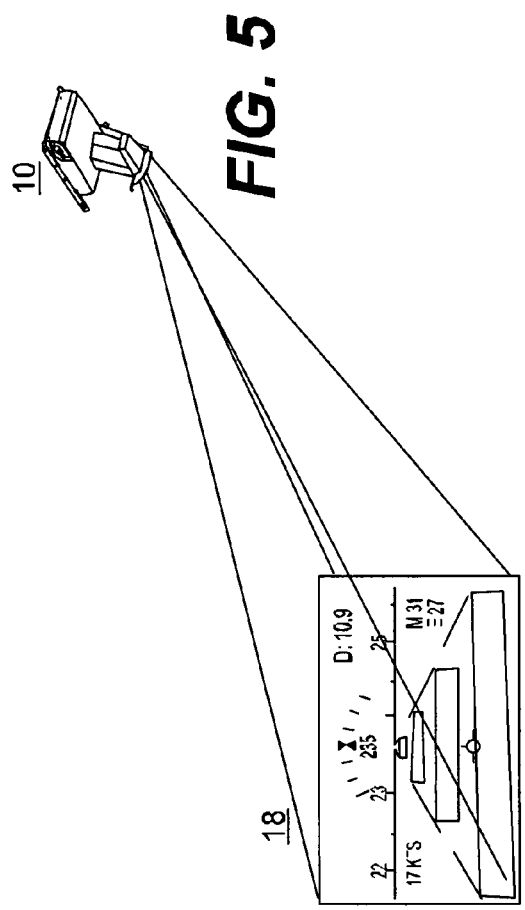
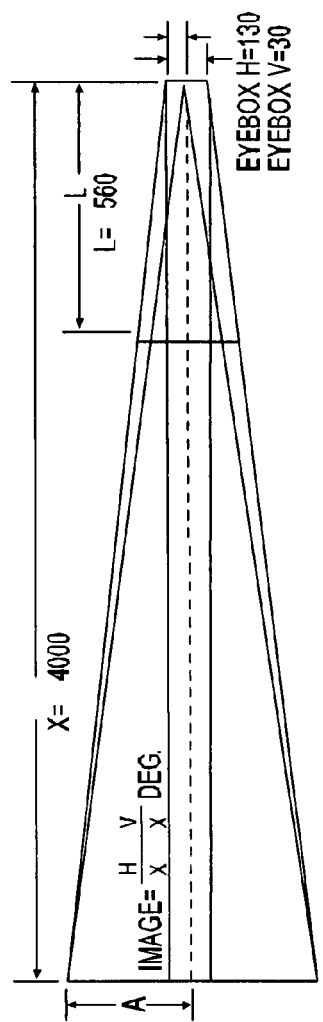
FIG. 5
FIG. 6

UNIVERSAL VEHICLE HEAD UP DISPLAY (HUD) DEVICE AND METHOD FOR USING THE SAME

BACKGROUND OF THE INVENTION

1. Field of the Invention

The invention generally relates to an integrated head up displaying (HUD) device including a housing that houses an active-matrix image projecting system and its accompanying electronics, and an optical combiner (for providing a see-through image thereon) connected to the housing via a retractable arm attached at one end to the main body and holds the HUD optical panel at its other end. In particular, the telescopically retractable arm allows the assembly to extend or retract for a desirable combiner height. Further, the LED backlighting array is placed within a reflective light chamber which is lined with a safe, light-weight, low cost, specular, reflective sheet for high reflectivity. The non-conductive, reflective sheet also covers the LED printed circuit board.

2. Description of the Related Art

Head-up display (HUD) devices are widely used in vehicles for both business and home purposes. The use of and developments in HUD technology continue to explode. Current HUD systems differ from one another in terms of projection technology, resolution, positioning-adjustability, viewing flexibility, size, shape, and installation convenience. For example, U.S. Pat. Nos. 3,503,146 and 5,841,408 teach an automatic apparatus for moving a combiner assembly away from the pilot's head only in the event of a crash. U.S. Pat. No. 3,945,716 rotates the HUD about an axis in line with the pilot's head. It is slaved to a Forward-Looking-Infra-Red (FLIR) or TV tracker and the entire unit (including the combiner) turns with the pilot's head. The system uses a CRT for the display and an expensive holographic lens. It has only one pivot point to move the combiner.

U.S. Pat. No. 5,381,267 uses a four bar linkage to support a HUD combiner to swing between an upper storage position and a lower operating position solely to stow the combiner assembly. It is not possible to adjust the display (arranged at an identical desired viewing angle) to different vertical positions.

U.S. Pat. No. 4,188,090 provides a complex HUD combiner and optical projector, combined as a solid single unit for one eye, i.e., a monocular system. The unit is hinged and rotates to a stowed position. However, the monocular system is designed so the viewer's eyes are always approximate to the focal point of the objective lens thereby maintaining an image subtended size and a viewing angle, rather than providing viewing flexibility. In addition, the flat combiner does not support any focal change.

U.S. Pat. No. 4,937,665 shows a small mirror adhered to the inside of a car windshield and above the driver's line of sight, for reflecting back a video, movie, TV program, etc. to one eye of the driver. A display is separately mounted overhead and is focused to infinity.

U.S. Pat. No. 6,078,428 mounts a head-up collimator (including a projector and a semi-transparent mirror that is used by being placed before the user's eye) in a support. By adjusting bolts and hinges of the support with the feature of potting a tapered pin in resin, exact alignment of the support with respect to the structure of the aircraft in axes X, Y and Z during reinstallation after maintenance becomes possible. However, the semi-transparent mirror is only allowed to rotate about the x-axis, but cannot be vertically lifted with respect to the projector without rotation.

U.S. Pat. No. 6,445,506 mounts a combiner on an axis so as to flip to a stowed position on top of the projection with a motor analogous to flipping a page of a book. The rotational axis, the display surface of the combiner, and the projector are arranged at fixed angles.

U.S. Pat. No. 4,775,218 uses a LED alignment detector to determine whether a holographic combiner based with an infinity focus is arranged with a separately mounted cathode-ray tube within a prearranged operational tolerance. The combiner only stows rearward, and the sensitive holographic optics requires unique pilot calibration such that the combiner cannot be easily adjusted to a pilot's preference.

U.S. Pat. No. 5,517,337 shows a retractable holographic combiner with a movable holographic mirror placed before the pilot's eyes, and designed for presenting light images collimated at infinity, superimposed on the external scene, and coming from a projector positioned up-line with respect to the combiner. The holographic mirror is connected to a fixed part of the aircraft by a hinged support constituted by a single lateral connecting arm to the fixed part of the aircraft. However, the projector and the arm are separately fixed to the aircraft rather than integrated into one unit to be fixed to an aircraft. In addition, the arm only stows rearward. Further, the system uses holographic components which are sensitive to alignment.

U.S. Pat. No. 5,867,287 shows a HUD with a lens de-centered to the optical axis of the bright display backlighting illumination which requires a high intensity halogen bulb, IR filters, Fresnel lens and cooling fans. In addition, its display emits a yellow orange color due to the low dimming levels of the incandescent bulb such that a green display used in aircraft would turn brown at night rather than stay the same color. Furthermore, the halogen bulb reflectors result in a "Flashlight beam" effect that must be de-centered and diffused to provide even illumination. Holographic optical elements, including lenses, mirrors, gratings, prisms and beam splitters made by holographic methods, operate efficiently only over a narrow band of wavelengths.

U.S. Pat. No. 6,072,444 provides a HUD device mounting assembly that enables optical alignment between the HUD projector and the image combiner, although the combiner assembly and the optical projector are separately mounted to the cockpit of an aircraft. The components are not integrated into a single unit to reduce the likelihood of tolerance issues.

U.S. Pat. No. 6,343,863 uses a bulky frame to support and align an optical unit and a head-up display in a cockpit of an aircraft, and a sensor coupled to the frame for sensing the vertical position of the frame and providing a signal to the computer to adjust at least part of the image displayed on the combiner to correspond to the position of the frame. The frame only moves in a generally vertical direction relative to the cockpit, rather than any other directions, and it requires a motor to move the bulky frame.

U.S. Pat. No. 4,725,125 stows a projector and a combiner flatly into the dashboard of a vehicle using kinematic chains. Dash mounting (rather than head-mounting) causes significant sun intrusion issues.

U.S. Pat. No. 6,301,053 shows a combiner assembly 20 having an optical combiner 21 mounted to a housing 22, which is further arranged for mounting to a roof structure of a flight deck of an aircraft. Via the combiner, a user views an outside scene overlaid with a projected image. However, the combiner and stowage arm assembly is separately mounted to the aircraft from a display forming section (i.e., a projector; not shown). In addition, the combiner and stowage arm assembly is complex since it requires kinematic linkages with four pivot points.

In view of the state of the prior art as discussed above, there is a demand for a self-contained, universal compatible, low-cost heads-up display devices to "fit" into existing vehicles, while delivering acceptable optical and image brightness performance.

SUMMARY OF THE INVENTION

The engineering design philosophy of the HUD system of the present invention creates a unique configuration that encompasses all aspects of safety, low cost, functionality, human factors and good optical principles, especially for aircraft. Years of aircraft HUD history provide an abundance of resources, hardware configurations and optical layouts that contribute to finding a solution that will meet a variety of difficult requirements. This vast knowledge has led to the present invention embodying a unique and novel design that is highly functional and meets the economic requirements of, among other industries, today's general aviation marketplace.

Initial studies of the HUD system concept were configured with the HUD installed in the top of the aircraft instrument panel. The instrument panel installation results in a HUD package position approximately 25 inches away from the pilot for most general aviation installations. Field of view requirements, paralleled with the far combiner distance, results in designs that have overly large combiners and optical packages. It was found that installation and retrofit of these designs, into existing aircraft panels, would cause substantial cutting of the existing structure and repositioning of impacted instruments. Besides compromising the original aircraft panel and related components, this option would result in tremendous financial and FAA certification issues for the aircraft owner.

The mounting of the HUD system of the present invention in an overhead position provided several advantages:

No compromising of the existing instrument panel structure.
Allows the combiner to be placed closer to the pilot's eyes, reducing size.
No intrusion of direct sunlight into the optical system.
Allows easy access to adjustments and controls.
Allows for a straight refractive optical system providing simplicity and quality.

Adjustment of pilot seated height, in relation to positioning and calibration of the HUD virtual image to the horizon, is key to the HUD system's configuration. This critical adjustment is made through the use of an expandable telescopic arm that is integrated to the main housing. The end of the arm holds the combiner and allows for fine calibration of the virtual image vertical position. The combiner moves up and down to keep it centered between the pilots seated eye position and the horizon, allowing for maximum eyebox and conformal information overlay. The direction of telescopic travel is down/forward and up/rearward to correspond with the correlation of leg and torso length variance.

Selection of a combiner type (spherical, aspheric or flat) is also a principle characteristic of the HUD system of the present invention. The selection of an optically flat combiner allows for the adjustment of distances between the main objective lens and the combiner itself, which is necessary due to changes in pilot height adjustment. Since light exiting the housing of the HUD system exhibits all the necessary magnification and is nearly collimated, the selection for use of a flat combiner becomes clear. The combiner can be moved up and down via the telescopic arm without changes in system magnification, apparent image size or distance. Changes in magnification would have the negative result of varying image size and distance in relation to the pilot seated height.

The reflection of an image off a flat combiner surface retains it's optical characteristics through changes in reflection angle. This is not so with the use of curved combiners (spherical or aspheric.) The reflection angle off a curved combiner (approximately 54 degrees) would create a slight "smile" to the image, which would wash from side to side with head movement. A flat combiner would not exhibit these drawbacks.

The key issues with the combiner will be second surface reflections and the material used. Several solutions are available for these issues. Since the combiner is close to the eye, the quality of optically ground glass is not necessary. Glass presents safety concerns in the cockpit. The recommendation is for commercially available clear cast 3/16 acrylic plastic.

One approach for elimination of second surface reflections would be the application of an anti-reflective coating on the back side of the plastic combiner, further enhancement would be accomplished by the application of a slight (<30%) aluminum reflective coat on the face of the combiner.

A unique and novel approach to eliminate second surface reflections and thereby eliminate the need for expensive coatings involves optically grinding and polishing a slight wedge angle into the acrylic sheet. This "wedge" shape would superimpose the primary image from the face of the combiner with the reflection caused by the second surface. If this process is not commercially economical, the parts could be cast with the proper shape from CR39 optical lens material in higher volumes.

Contrary to known concerns about the use of refractive optics, the positioning of the HUD system of the present invention into an overhead position prevents the unwanted intrusion of direct sunlight. This eliminates issues of visible sun reflections and magnified sunlight focusing on internal components. It now becomes possible to utilize low cost refractive spherical or aspheric lenses that provide good optical performance, such as those listed below, at higher magnification levels:

Vertical and horizontal disparity: <0.50 milliradians
Optical back focus length: 275 mm
Objective lens: 290 mm focal length×150 mm diameter
Field of View (FOV): 5 degrees vertical×10 degrees horizontal
Virtual image brightness: >1,000 Ft. Lamberts to the eye
Virtual Image Distance 6.0 meters In view of all the above, it is a purpose of this invention to provide a self-contained, universally-compatible, low-cost HUD device that can be fitted into any one of a variety of vehicles, including but not limited to general aviation aircraft (both airplanes and helicopters), commercial or passenger aircraft, private powered boats, commercial vessels, passenger ships, trucks, and special-purpose land vehicles.

It is another purpose of this invention to provide a HUD system that will allow the elimination of or minimizing the need for a PC-based or conventional display-based navigation system (i.e., displaying on a conventional display monitor).

It is still another purpose of this invention to provide a HUD system in which the combiner can be operationally positioned and re-positioned repetitively and consistently, while only causing a minimum degree of interference with a user's field of view.

It is still another purpose of this invention to provide a HUD system that ensures the frontward retraction of the combiner in the event of shock or an emergency when it is in an operational position.

BRIEF DESCRIPTION OF THE DRAWINGS

The foregoing and additional features and characteristics of the present invention will become more apparent from the following detailed description considered with reference to the accompanying drawings in which like reference numerals designate like elements and wherein:

FIG. 5 is a view of the combiner of the HUD system showing the video or display imagery projected onto the combiner according to the present invention; and FIG. 6 illustrates how the field of view is calculated for the HUD system according to the present invention.

DESCRIPTION OF THE PREFERRED EMBODIMENTS

Figure 1:
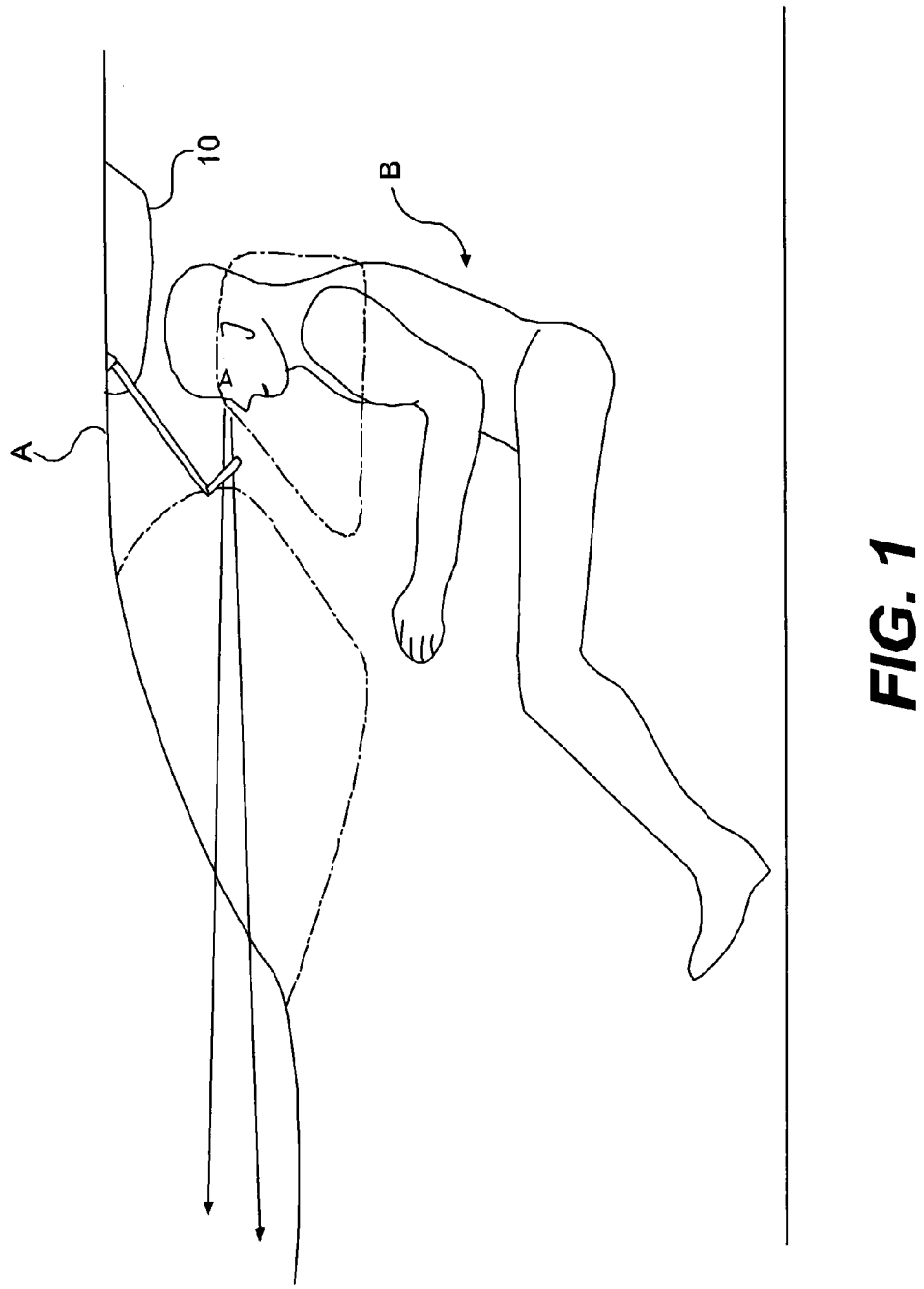
FIG. 1 shows a side view of a cockpit comprising a HUD system according to the invention.

With reference to the figures, like reference characters will be used to indicate like elements throughout the several embodiments and views thereof. FIG. 1 shows a schematic view of a pilot's cabin or cockpit, wherein the ceiling A of the cabin and the pilot's station B set limits of visibility, i.e., the field of view for the pilot. A HUD 10 is mounted above the pilot's head on the ceiling via fixing means, such as screws or other conventional mounting devices, as will be discussed further hereinbelow. Resin/pin alignment techniques are also applicable for fixing the HUD 10 to the ceiling A.

As shown in FIGS. 2A-2D, the HUD 10 has a housing 12, mounting elements 14, a retractable arm 16, a high resolution display screen/optical combiner 18, control panel 20, and a window 22 visible from outside. Inside the housing 12, (see FIGS. 3C and 3D), there is a controller 34 (in this embodiment, composed of power controller board 34A and digital video board 34B) that provides the electronic circuitry controlling the HUD 10, as well as a LCD panel 24, a first fold mirror 26, a main objective lens 28, a second fold mirror 30 and a main mirror 32 optically assembled into an optical system to generate the images to be displayed externally on the optical combiner 18 for the pilot to view. In at least one embodiment, the housing 12 is preferably 3.4-3.55" thick, 10.7" wide, and 12-13.5" long.

The controller 34 may be composed of a microprocessor circuit or other similar programmable data processing circuit having the necessary circuitry and processing capacity to generate a video or visual image display that will be updated at least periodically or preferably in real-time (i.e., as new data for display is processed, as circumstances change). As such, the controller 34 should be able to provide at least the following functions: (1) power to all internal circuitry and electrical components (i.e., power controller board 34A); and (2) processing of inputted data and generating of video data to be inputted into the LCD patent 24 (i.e., digital video board 34B). Data signals providing navigational information may be inputted into the controller 34 via conventional data connection and transmission devices (i.e., RS-232 cabling, USB connection, serial connection, ribbon cabling, etc.) available in the aircraft or other vehicles.

Figure 2A:
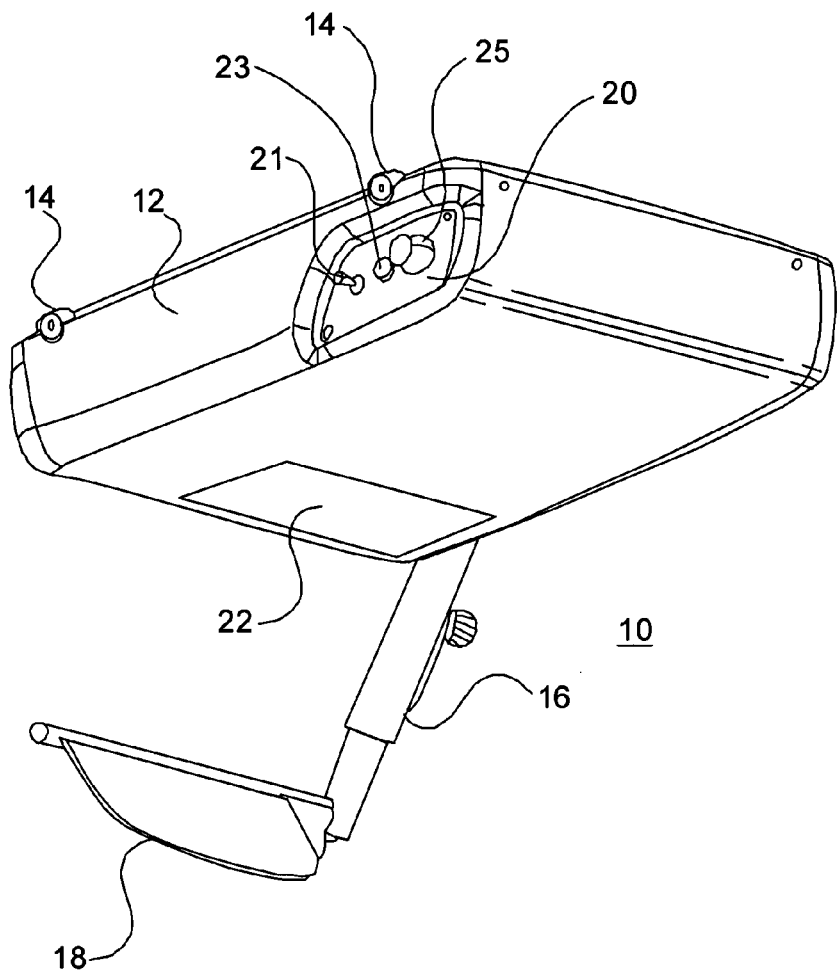
FIG. 2A is a overall perspective view of a HUD system according to the invention.
Figure 2B:
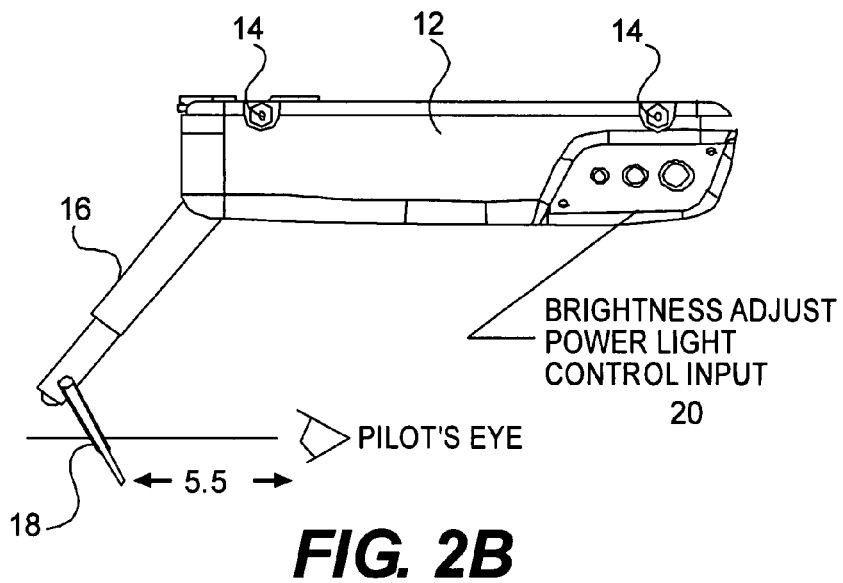
FIG. 2B is an overall side view of the HUD system according to the present invention.
Figure 2C:
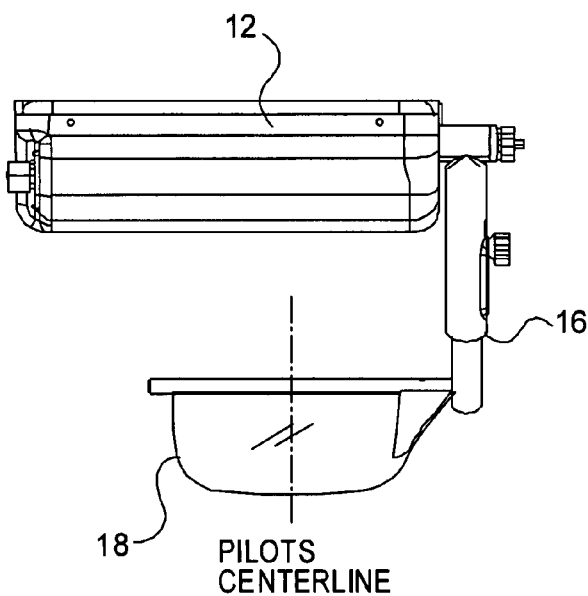
FIG. 2C is an overall rear view of the HUD system according to the present invention.
Figure 2D:
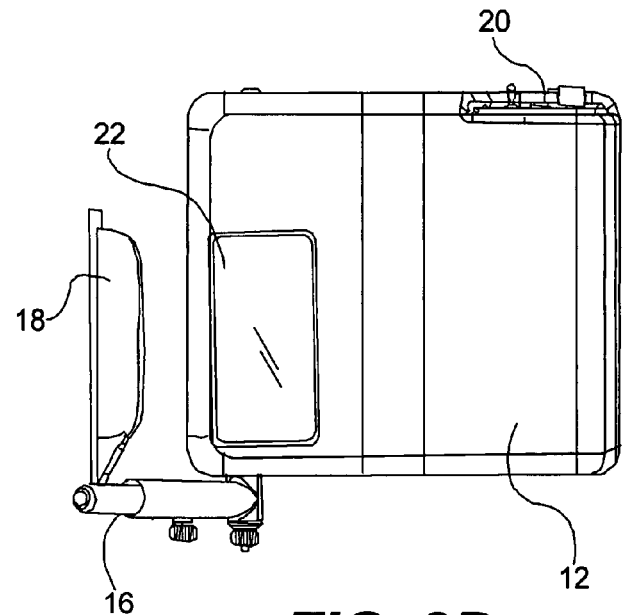
FIG. 2D is an overall bottom view of the HUD system according to the present invention.
Figure 3A:
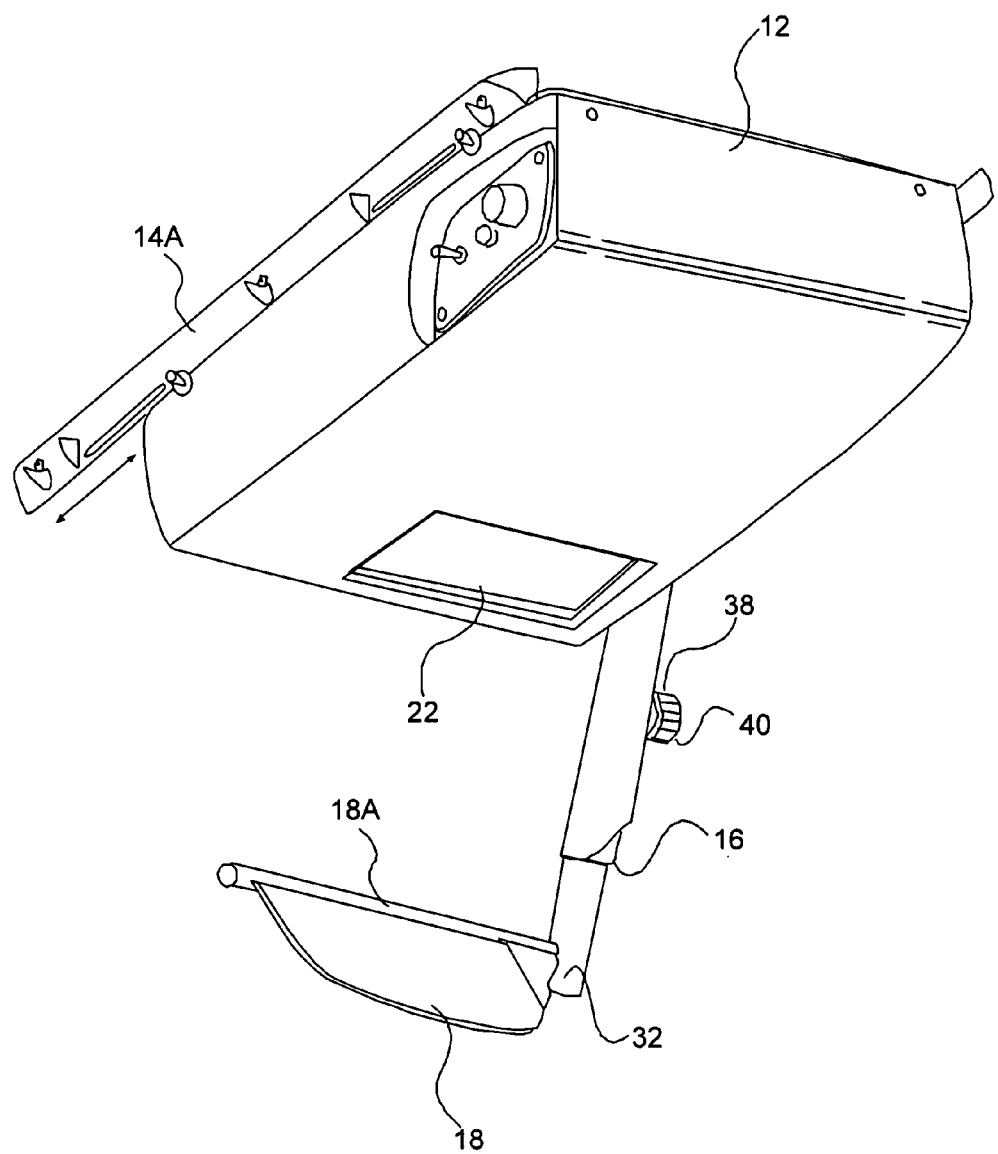
FIG. 3A is an overall exterior perspective diagram showing the main components of the present invention in one implementation of the present invention.

As shown in FIG. 2A, the mounting elements 14 may consist of screws, mounting brackets or other fixed mounting devices known in the art. One variation as shown in FIG. 3A would use a mounting track 14A wherein the housing 12 would be allowed to slide along the track 14A in order to achieve another degree of adjustability. However, such a mounting track would require a locking mechanism (not shown) that would lock the housing 12 in the selected position. The implementation of such a locking mechanism in conjunction with the mounting track 14A would be known to one of skill in the art.

Figure 3B:
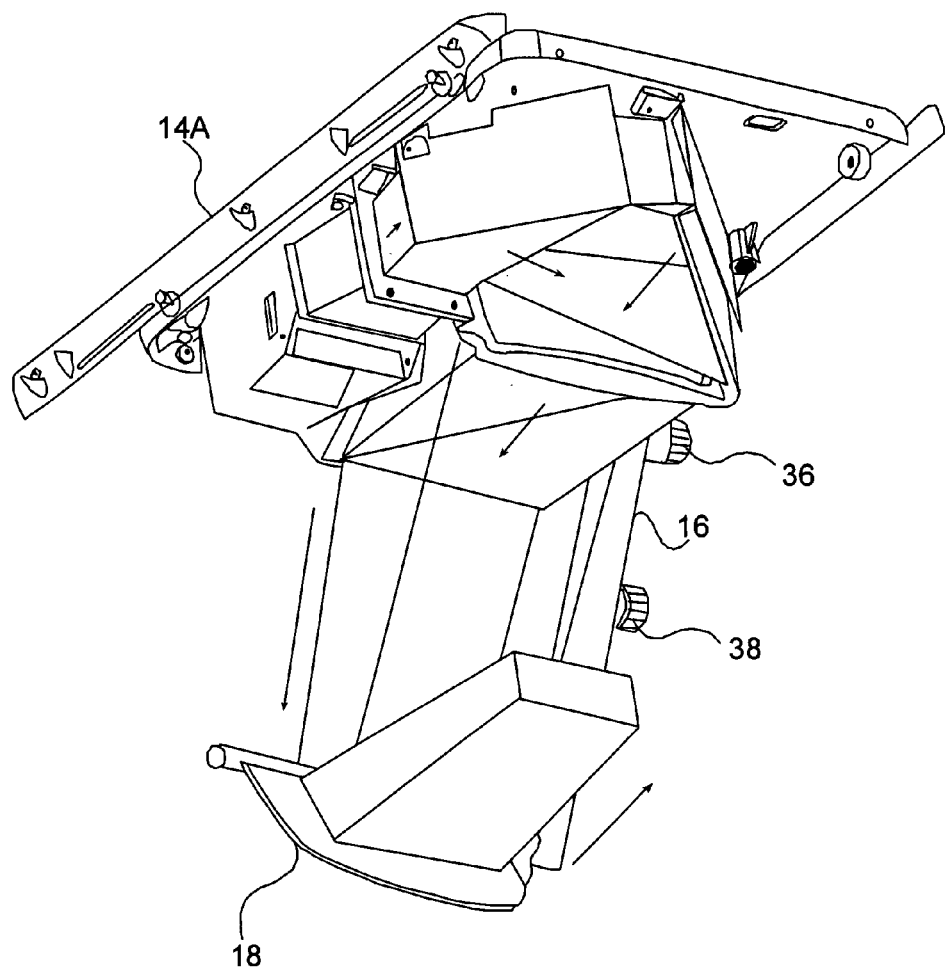
FIG. 3B is an interior perspective diagram showing the main components of the present invention as mounted in the one implementation of the present invention.
Figure 3C:
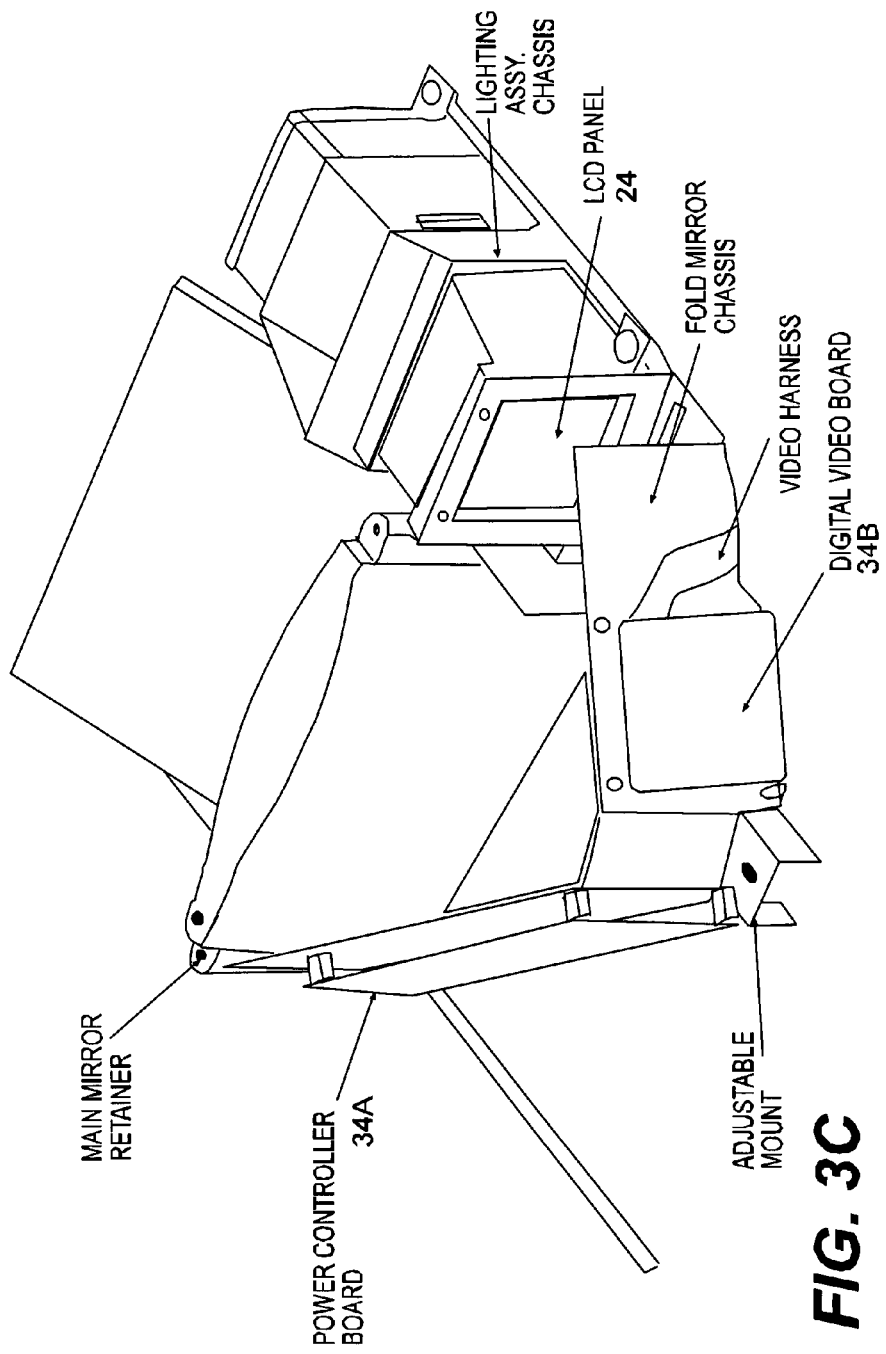
FIG. 3C is a first interior perspective view highlighting the interior components of the one implementation of the present invention.
Figure 3D:
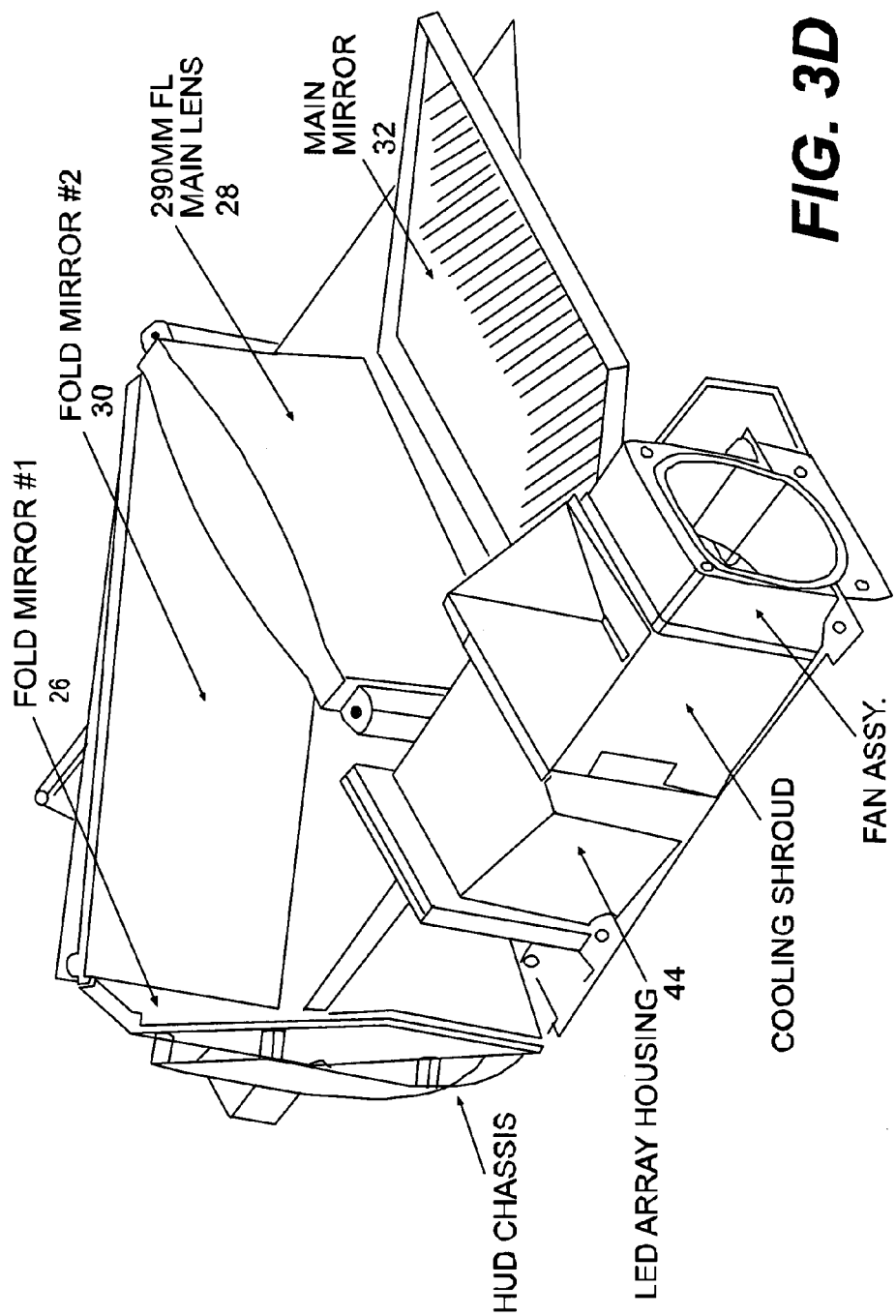
FIG. 3D is a second interior perspective view highlighting the interior components of the one implementation of the present invention.

As shown in FIGS. 3B-3D, the first fold mirror 26 is used to effect a horizontal side fold of the image emitted from the LCD panel 24 through the main objective lens 28, and then onto the second fold mirror 30. The second fold mirror 30 effects a vertical fold of the image reflected from the first fold mirror 26, onto the main mirror 32 and then out to the combiner 18. In one embodiment, these mirrors will be manufactured out acrylic plastic for cockpit safety. The optical folds effected by the mirrors are used to reduce package size and properly direct the optical rays. This results in the images generated on the LCD panel 24 being provided to the combiner 18 to be flipped vertically, so when put through the optical system, the images are right side up.

Referring specifically to FIG. 3B, the LED light from the LCD panel 24 is refracted at 90 degrees by the first fold mirror 26 towards the main lens 28, and then refracted by the second fold mirror 30 passing the window 22 onto the optical combiner 18.

FIG. 5 illustrates one arrangement of display images that would be projected onto the combiner 18. For example, green computer-generated flight instrument symbology generated by the controller 34 (i.e., video control board 34B) based in inputted data from outside data sources (i.e., flight instrumentation data, GPS signals, navigation telemetry) may be presented on the combiner 18. Such symbology may include compass direction, air speed, distance to destination, current location, wind direction, fuel level, travel path and various warning symbols. The symbology may also be varied depending on the type of vehicle using the HUD system of the present invention. Specifically, the symbology used in an aircraft may be different from the symbology that would be used on a boat or a special-purpose ground vehicle.

In the embodiment shown in FIG. 2A, the control panel 20 has at least an on/off switch 21, a control input 23, and a brightness adjust knob 25. In other embodiments, the control panel 20 may include an on/off switch 21, a control input 23, a brightness adjust knob 25, a video signal input (e.g., supporting NTSC Standard Single RCA connection), a vertical FLIP control, a horizontal FLIP control, and a DC power input. The DC power to be inputted may be defined as 9-15 Volts (12V nominal) with 800 mA minimum current and 1.2 amps nominal (at full brightness), and the input is a 5.5 mm-diameter OD male (ground) with a 2.3 mm-diameter power pin.

Figure 2E:
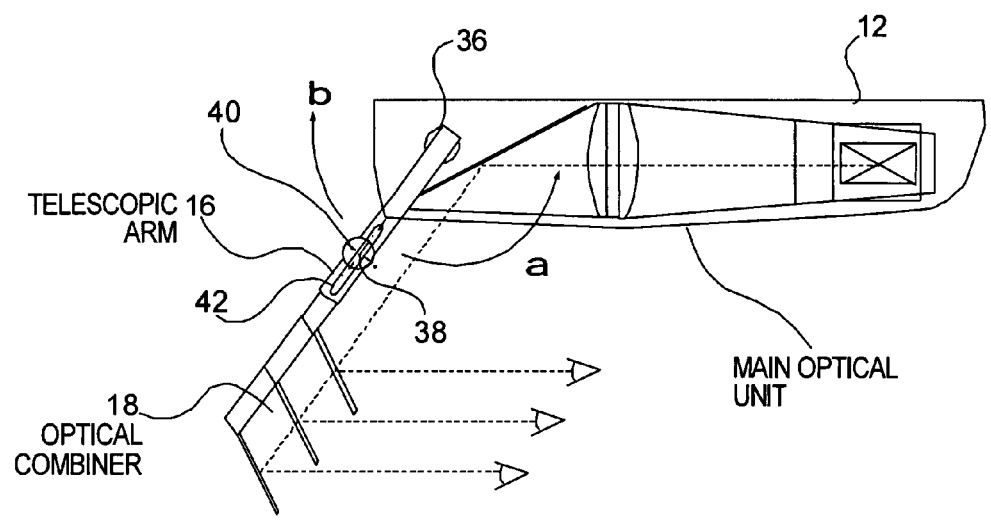
FIG. 2E is an overall side view of the HUD system illustrating the adjustable positioning of the combiner according to the present invention.

As shown in FIG. 2E, the HUD system 10 stows the combiner 18 overhead with a rotatable/telescopic composite arm 16. When rotated in the a direction, the arm 16 is stowed and typically rests close to the ceiling of the cabin adjacent the housing 12. When in use, the arm 16 is pivoted at the first pivot point 36 so to move the optical combiner 18 towards the pilot's head. The arm 16 may be stowed forward in the βdirection with detented forward motion availability to avoid the pilot's head coming in contact the arm 16. The arm 16 allows the assembly to fold forward for temporary in-flight stowage and rearward for more permanent stowage, system removal and portability. In addition, the optical combiner 18 can be angled towards or away from the pilot at the second pivot point 38. Further, the single composite telescopic arm 16 allows vertical adjustment for different pilot seat heights. Once locked into position and the combiner 18 height is adjusted to pilot preference, fine vertical image adjustments can be accomplished, such as by adjustment of the combiner 18 about the horizontal top edge axis. A thin horizontal axis bar 18A (see FIG. 3A) serves as both the primary fastening location of the combiner 18, but also provides the pilot with a true aircraft/vehicle horizontal reference in direct view for comparison with a displayed horizontal situation indicator. In this embodiment, the combiner 18 is formed as a flat element, whereby no focal change is necessary when the position of the combiner 18 is adjusted.

The arm 16 includes two tubes which are telescopically slidable in a single axis. A locking mechanism 40 including a groove and a screw slidably moveable in the groove 42 is provided to lock the arm 16 at a desired vertical position. Image subtended size (viewing angle) can be maintained in that the HUD system is designed so that the pilot's eyes are positioned to be always at approximately the same distance to the focal point of the main objective lens 28.

The rotational and telescopic movement of the composite arm 16 provides flexible and unique positioning without the need for a complex Kinematic linkage system. The structure of the arm 16 takes into consideration pilot head contact through its arm angle and detented forward rotation capabilities. The optical exit angle positions the combiner 18 in space such that the connection of the arm 16, back to the housing 12, creates a safe angle for incident head contact. Such adjustment of the display screen or combiner 18 closer or further from the housing 12 of the HUD system 10 would be impossible in the prior art systems, since it would result in optical misalignment, de-focusing and magnification issues.

As shown in FIG. 3D, the optical system within the housing 12 has a LED backlighting array 42 for diffusing broad illumination. The LED backlighting array projects evenly distributed LED light into a reflective light chamber 44 that utilizes, for example, a Dupont® 99% reflective polymer film (not shown) on the internal walls. This design provides the brightness and high internal reflectivity of a solid glass prism (or acrylic light-pipe) 48 without the mass and cost, and eliminates the need for hot high brightness halogen bulbs, IR filters, fresnel lenses, cooling fans, optical de-centering, etc.

In one embodiment of the present invention, the LED backlighting array 42 is selected using such units that are currently the brightest projection sources available for non-military head-up displays. Such LED backlighting arrays can generate 100,000 foot-Lamberts of light energy output versus 20,000 foot-Lamberts from lighting units used in conventional HUD devices. Preferably, the LED lighting unit 42 applies high brightness 532 nm green LEDs in a rectangular array, in conjunction with a polished "reflection tube" having properties of a large lightpipe. The inventor has determined that this wavelength of LEDs in conjunction with a TFT-LCD display panel presenting graphics in a Cyan (Light blue/green) allows maximum transmission of LED light through the LCD panel 24.

Figure 4A:
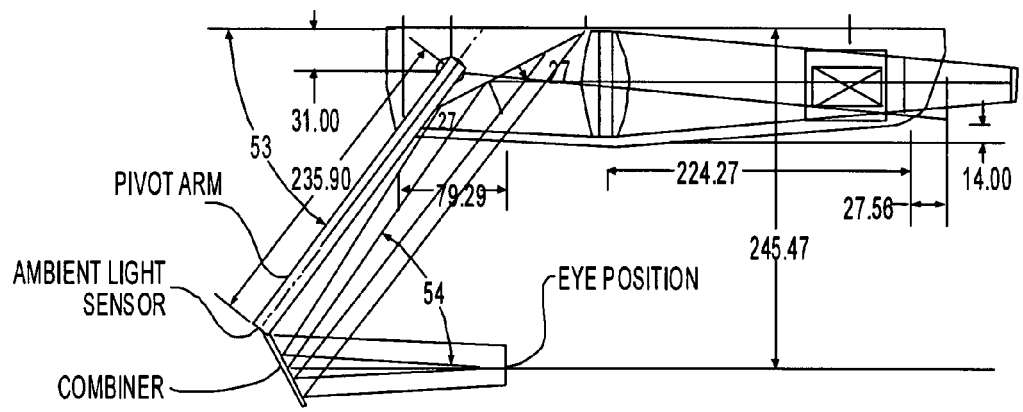
FIG. 4A is a side view of the HUD system illustrating an optical ray trace pattern representative of the system in operation.
Figure 4B:
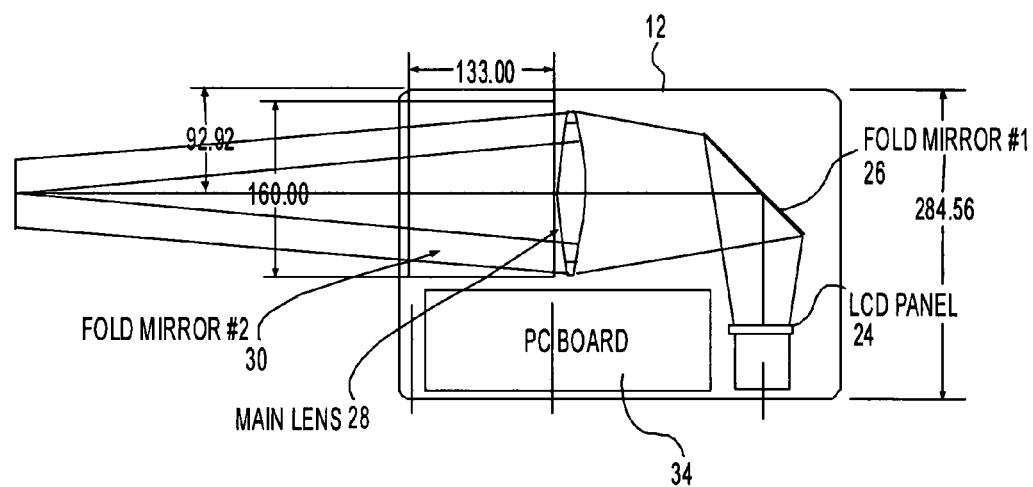
FIG. 4B is a bottom view of the HUD system illustrating an optical ray trace pattern representative of the system in operation.

Referring to FIGS. 3A, 4A and 4B, an ambient light sensor 32 may be installed at the end of the arm 16 to sense any light refracted by the second fold mirror 30 to ensure the refracted light (i.e., the virtual image) is presented at approximately 6 meters (20 feet) from the pilot's eyes and superimposed on the distant, background scenery. The refracted light is not focused at infinity like other prior art HUD systems. The inventor has determined that the focal distance of 6 meters is the optimal distance for a pilot's ease of viewing and readability.

In particular, using a theoretical optical system with a fixed constant of 10×magnification, the following Table 1 shows the ratio of system optical path length and display dimensions (for a 5°×10° FOV) as virtual image distance increases. In effect, the result is that the larger the package size, the greater the weight and the cost.

Further, Table 1 below illustrates, using a 2.5 meter image distance, that the HUD box needs to package a 160.5 mm (6¼ inch) optical system. Thus, for optical infinity, the same 10× geometry system would need to package an optical system almost 3 feet long.

TABLE 1

| | Virtual Image Distance (meters) | | | | |
|---|---|---|---|---|---|
| | 2.50 | 3.00 | 4.00 | 5.00 | Optical ∞ |
| Optical path length (mm) | 160.5 | 208.6 | 304.6 | 400.6 | >880 |
| Display size (mm) H × V | 44 × 22 | 53 × 26 | 70 × 35 | 88 × 44 | >176 × 87 |

Another significant contributor to package size is the virtual image field of view (FOV.) If, conceptually, the image forming combiner is placed just beyond instrument panel distance, for example 560 mm (22 in.), FOV and eye box size have a dramatic effect on the combiner size. Using a fixed eye box size of 130(h)×30(v) mm and an image distance of 4.0 meters, the following table illustrates combiner size in relation to field of view, where the calculation show below is illustrated in FIG. 6:

TABLE 2

| Combiner size = (Y + (L * TAN A) − ((Y * L)/X)) * 2 | | | | | |
|---|---|---|---|---|---|
| | Image Size (FOV) (degrees) | | | | |
| | 2° × 4° | 4° × 8° | 5° × 10° | 7.5° × 15° | 10° × 20° |
| Horizontal Combiner Size (mm) | 150.9 | 190.1 | 209.8 | 259.2 | 309.3 |
| Vertical Combiner Size (mm) | 45.3 | 64.9 | 74.7 | 99.2 | 123.8 |

Table 2 above shows with a 10°×20° FOV the combiner would need to be over 12 inches wide and almost 5 inches tall. The accompanying package, to properly stow and provide clear optics, would be much too large for general aviation aircraft. This justifies the need to keep the FOV as small as possible.

Taking all the above factors into consideration, the inventor as noted above that 6 meters as an optimum focal distance. However, if other factors are taken into consideration based on the above-discussed calculations, different focal distances may be used to accomplish the same purpose intended by the present invention.

The LCD panel 24 may be a thin-film transistor (TFT) LCD device with a resolution 480(w)×234(H), a color peak of 532 nm green, and a contrast of 150:1. When positioned with a LED light source discussed above, the TFT-LCD device has a minimum brightness (before off) of 2 foot-Lambert and a maximum brightness of 1120 foot-Lambert.

The HUD 10 of the present invention is optically designed to obtain high reflectivity without the use of expensive glass laminated holography, as is done in the prior art. Holography is sometimes necessary to create off-axis reflections in a wavelength peak in some traditional display units. Without using sensitive holographic optics, the HUD 10 can be easily positioned and adjusted to each individual pilot's preference. Without using sensitive holographic optics, The HUD 10 does not require conformal information for individual pilot calibration. For example, U.S. Pat. No. 5,867,287 emits a yellow-orange color due to the low dimming levels of the incandescent light that is used. A green display, as used in aircraft, would turn brown at night using the system described in the '287 patent. In contrast, the LED lighting unit 42 maintains its color spectrum at all illumination levels. In addition, using halogen light reflectors creates a "flashlight beam" effect that must be de-centered and diffused to provide even illumination.

The size of the combiner 18 and the size of the window 22 are paired such that the pilot does not see the mechanical components related to the housing assembly. In one embodiment of the present invention, the HUD 10 supports a field of view of 10 degrees horizontally×7.5 degrees vertically, and an aspect ratio of 4:3, an image distance of 6 meters (20 ft), an eyebox size of 72 mm horizontal (cyclopean) and 30 mm vertical.

The overhead mounting and system architecture is designed such that objectionable sunlight cannot enter the optical system. Off-axis reflection is not necessary and broad spectrum reflectivity can be obtained. A safe, light-weight, low cost, cast acrylic sheet is laminated on the glass combiner 18 which was not practical or functional in the prior art. Light-weight materials reduce the likelihood of objectionable vibration, as would be prevalent with a heavier laminated glass combiner.

The HUD 10 integrates the arm 16 and the optical display housing 18, allowing the entire system to be installed and removed as one unit thereby reducing the likelihood of tolerance issues. This unique HUD 10 provides contrast, brightness, resolution and optical clarity comparable with systems of substantially greater cost. The HUD 12 is simple, robust and measured-up to the performance expected by today's general aviation pilots.

The principles, preferred embodiments and modes of operation of the present invention have been described in the foregoing specification. However, the invention which is intended to be protected is not limited to the particular embodiments disclosed. The embodiments described herein are illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A head up display device, comprising:
    an image generator mounted above a user's head;
    a display for receiving an image from the image generator; and
    a telescopically retractable arm for positioning the display in front of the user's eyes, said arm being mounted to the image generator at one end thereof and being mounted with the display at the other end thereof to pivotally rotatably engage the image generator with the display,
    wherein said telescopically retractable arm includes two tubes which are telescopically slidable in a single axis.

2. The head up display device according to claim 1, wherein the display is an optical combiner.

3. The head up display device according to claim 1, wherein the image generator includes a LCD panel.

4. The head up display device according to claim 3, wherein the image generator further includes a first fold mirror for refracting light from the LCD panel at 90 degrees, a main lens from receiving light from the first fold mirror, and a second fold mirror for refracting light from the main lens onto the display.

5. The head up display device according to claim 3, wherein the image generator further includes a LED backlighting array for the LCD panel.

6. The head up display device according to claim 5, wherein the image generator further includes a reflective light chamber covered by a reflective polymer film on internal walls thereof.

7. The head up display device according to claim 5, wherein the LED backlighting array includes a plurality of green LEDs.

8. The head up display device according to claim 7, wherein the green LEDs emit light of 532 nm wavelength.

9. The head up display device according to claim 1, wherein the image generator generates at least one of flight instrument symbology and video images.

10. The head up display device according to claim 1, wherein an ambient light sensor is mounted with the display.

11. The head up display device according to claim 1, wherein the device supports a field of view 10 degrees horizontal×7.5 degrees vertical.

12. The head up display device according to claim 1, wherein the device supports an image distance of 6 meters.

13. The head up display device according to claim 1, wherein the arm pivots at a first pivot point on one end thereof mounted to the image generator to move the display towards or away from the user's head.

14. The head up display device according to claim 1, wherein the display is pivotally rotatably engaged with the arm at a second pivot point on the other end of the arm to adjust a position angle of the display.

15. The head up display device according to claim 1, wherein the arm is telescopically retractable for vertically adjusting a position of the display.

16. An optical combiner for receiving at least one image from an external image generator, comprising:
   a display; and
   a telescopically retractable arm for positioning the display in front of a user's eyes so as to display said image, said arm being mounted spot above the user' head at one end thereof and being mounted with the display at the other end thereof to pivotally rotatably engaged with the spot and the display respectively,
   wherein said telescopically retractable arm includes two tubes which are telescopically slidable in a single axis.

17. A head up display device, comprising:
   an image generator mounted above a user' head, said image generator including a LCD panel and a green LED backlight;
   a display; and
   a retractable arm for positioning the display in front of the user's eyes to display image, said arm being mounted to the image generator at one end thereof and being mounted with the display at the other end thereof to pivotally rotatably engaged with the image generator and the display respectively,
   wherein said retractable arm includes two tubes which are telescopically slidable in a single axis.

18. The head up display device according to claim 17, wherein the green LED backlight emits light of 532 nm wavelength.

* * * * *

UNITED STATES PATENT AND TRADEMARK OFFICE
CERTIFICATE OF CORRECTION

| | | |
|---|---|---|
| PATENT NO. | : 7,271,960 B2 | Page 1 of 1 |
| APPLICATION NO. | : 11/187833 | |
| DATED | : September 18, 2007 | |
| INVENTOR(S) | : Stewart et al. | |

It is certified that error appears in the above-identified patent and that said Letters Patent is hereby corrected as shown below:

Col. 1, line 7; please insert;

The invention disclosed and claimed herein was developed and/or implemented at least in part under a U.S. government contract No. NAS1-99065. Accordingly, the U.S. Government may have rights in the invention commensurate with the terms therein.

Signed and Sealed this

Seventh Day of October, 2008

JON W. DUDAS
*Director of the United States Patent and Trademark Office*